United States Patent Office 3,529,459
Patented Sept. 22, 1970

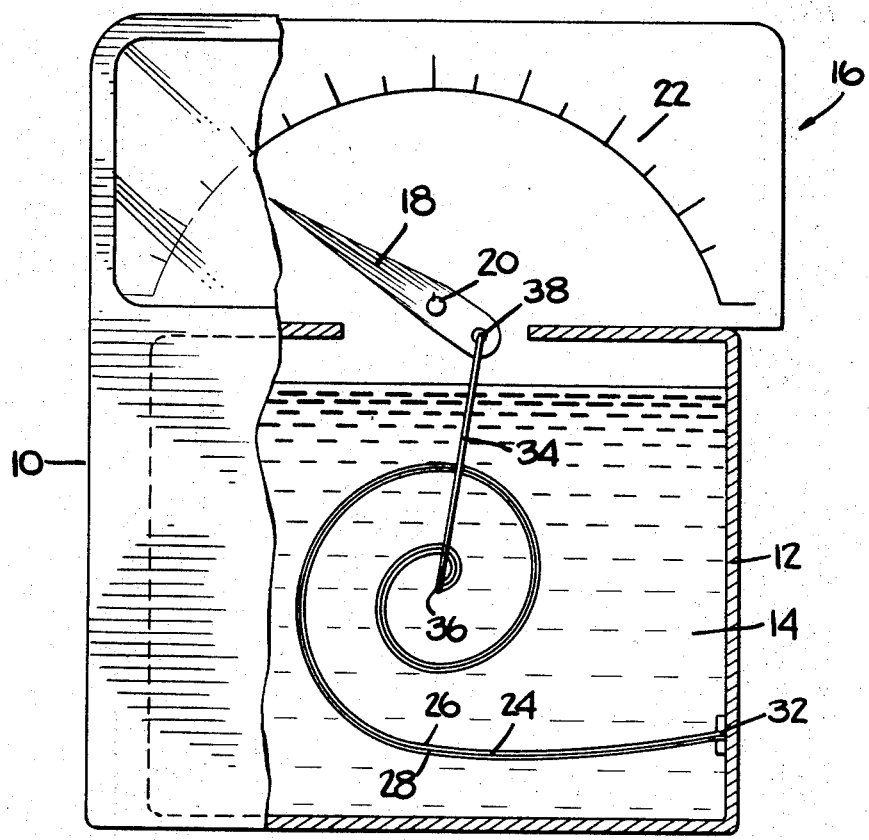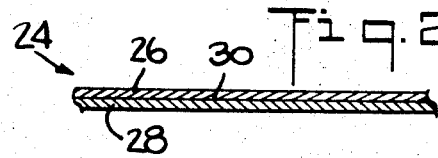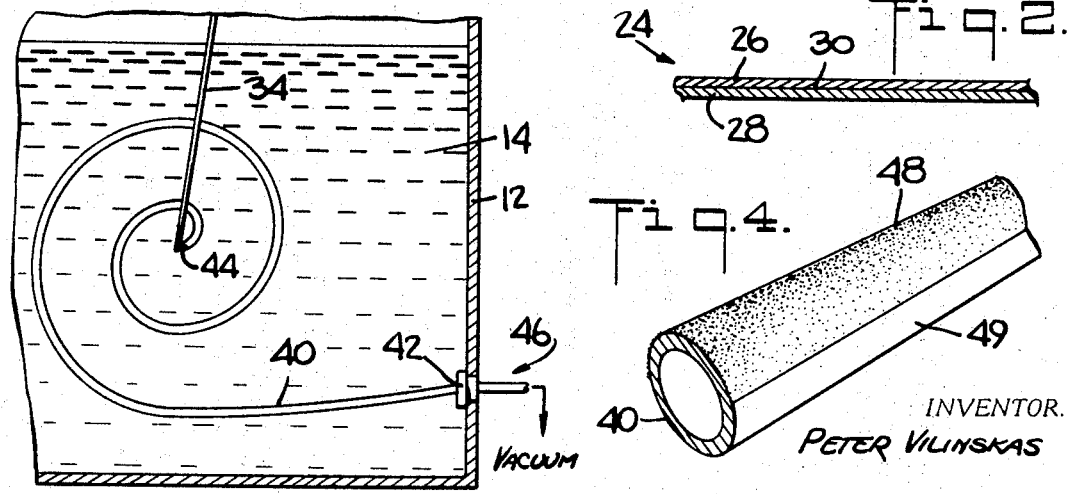

3,529,459
CONTINUOUS READING HYDROGEN METER
Peter Vilinskas, Riverview, Mich., assignor to Atomic Power Development Associates, Inc., Detroit, Mich., a corporation of New York
Original application Aug. 6, 1965, Ser. No. 477,854, now Patent No. 3,452,585, dated July 1, 1969. Divided and this application Mar. 1, 1968, Ser. No. 729,848
Int. Cl. G01n 7/04, 31/06
U.S. Cl. 73—23                          6 Claims

ABSTRACT OF THE DISCLOSURE

A hydrogen metering device characterized by a coiled hollow tube having a vacuum therein and fabricated from a material having a cell constant which changes responsive to variation in environmental hydrogen concentration, a coating covering substantially the surface of one half of the tube and extending along the length thereof fabricated from a material whose cell constant does not change in response to changes in hydrogen concentration so that a variation in the environmental hydrogen concentration causes anticlastic bending of the tube.

---

This invention relates to gas detection apparatus and more particularly to a metering device for measuring the concentration of hydrogen in an admixture of liquid sodium solution.

This application is a division of my copending application, Ser. No. 477,854 filed Aug. 6, 1965, now Pat No. 3,452,585.

According to the invention, the hydrogen metering device comprises a pair of coiled metallic members which are joined one to the other substantially along the entire length thereof. One of the members is fabricated from a material which has the property of changing its cell constant in response to a variation in environmental hydrogen concentration while the other of the members is fabricated from a material whose cell constant does not change substantially in response to changes in the hydrogen concentration. Whereby, a variation in hydrogen concentration causes an anticlastic bending of the pair of coiled members.

A feature of the invention resides in the provision of a new and improved metering device which is substantially less expensive and simpler than devices deemed necessary for indicating the hydrogen concentration in metallic fluids such as a liquid sodium solution, whereby apparatus components and manipulative operations are eliminated as compared to practices of the prior art.

Another feature of the invention is the provision of a device having greatly increased operating life without repairs, and reduced down time for repairs and replacement of parts as compared to prior such devices.

Still another feature of the invention resides in the provision of a new and improved device for measuring the concentration of hydrogen in a containment containing a liquid sodium solution which provides means for continuously monitoring the hydrogen concentration.

According to one form of the invention, the hydrogen metering device comprises a twin pair of solid metallic strands or straps, said strands being joined one to the other substantially along the entire length theerof. One of the strands is fabricated from a material such as nickel alloy steel having the property of changing its cell constant in response to variation in environmental hydrogen concentration. The other of the strands is fabricated from a material such as aluminum whose cell constant does not change substantially in response to changes in the hydrogen concentration. It will be appreciated that the coefficient of thermal expansion of aluminum is $18.35 \times 10^{-6}$ and for nickel allow steel the coefficient can be varied by means of varying the nickel content from $13 \times 10^{-6}$ to $19 \times 10^{-6}$. Accordingly, by selecting the appropriate nickel content for the nickel steel, the two metallic strands will have the same coefficient of thermal expansion. Therefore, a variation in the hydrogen concentration will be substantially the only cause of anticlastic bending of the pair of coil strands.

According to a modified form of my present invention, I provide a hydrogen metering device which comprises a length of coiled hollow tube fabricated from a material having the property of changing its cell constant in response to variation in environmental hydrogen concentration. Closure means are provided for one end of the tube and vacuum producing means are connected to the other end of the tube. A coating covers a substantial portion of the surface of one-half of the tube and extends along the length thereof. The coating has a thickness substantially less than the thickness of the metallic tube, and preferably, is of the order of about one thousandth the thickness of said tube. The coating is fabricated from a material such as aluminum which does not change substantially in response to changes in the hydrogen concentration. According to my invention the coating must be thick enough to slow down diffusion of the hydrogen on one side of the tube by a discernible factor with respect to the uncoated side of the tube. Also, the coating must be thin enough so that the thermal expansion does not interfere with the cell operation, whereby the variation in hydrogen concentration will cause an anticlastic bending of the tube.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may be readily utilized as a basis for the designing of other structures for carrying out the several purposes of the invention. It is important, therefore, that the claims be regarded as including such equivalent constructions as do not depart from the spirit and scope of the invention.

Several embodiments of the invention have been chosen for purposes of illustration and description, and are shown in the accompanying drawings, forming a part of the specification, wherein:

FIG. 1 is a side elevation, partially in section, showing a hydrogen metering device constructed according to the present invention;

FIG. 2 is an enlarged, longitudinal, vertical sectional view of a pair of coiled metallic strands;

FIG. 3 is a fragmentary vertical sectional view showing a portion of the metering device and more particularly showing a modified form of the coiled member; and FIG. 4 is an enlarged perspective view showing a portion of the coiled member of FIG. 3.

In the embodiment of the invention illustrated in FIGS. 1 and 2, there is shown a hydrogen metering device including a case 10 which encloses a containment 12 for containing a fluid such as a liquid sodium solution 14. The containment 12 may be a closed chamber or have an inlet and outlet (not shown), as desired. Indicator means indicated generally at 16 (FIG. 1) are mounted on the upper portion of the casing 10 and include a pointer 18 pivotally mounted on a pin 20. An arcuate scale 22 is provided to show the position of the pointer 18.

The hydrogen metering device according to my invention further comprises a coiled member 24 which comprises a pair of coiled metallic strands 26 and 28 as best seen in FIG. 2. The strands 26 and 28 are joined one to the other substantially along the entire length thereof as at 30. In the illustrated embodiment of the invention shown in FIGS. 1 and 2, the strands are dimensionally identical one with respect to the other, and one end of the coiled member 24 is connected to the containment 12 as at 32 while the other end of the coiled member is connected to one end of a connecting link 34 as at 36. The other end of the connecting link 34 is connected to the pointer 18 as at 38. In operation a very small change in the length of one of the coiled strands with respect to the other of the coiled strands causes movement of the free end of the coil 24, thereby causing movement of the connecting link 34 and a corresponding arcuate movement of the pointer 18.

One of the strands 26 of the twin, coiled metallic strands is fabricated from a material having the property of changing its cell constant in response to a variation in the environmental hydrogen concentration. For example, nickel alloy steel having approximately 20% nickel is a suitable material. The other strand 28 is fabricated from a material whose cell constant does not change substantially in response to changes in the hydrogen concentration. Aluminum is a suitable material, for example. It will be appreciated that when aluminum and a nickel alloy steel are employed for the metallic strands, a fractional linear expansion of the order of about $10^{-6}$ increase in length per unit length of one strand with respect to the other strand can be detected.

However, it will be appreciated that the coefficient of thermal expansion must be taken into consideration in selecting a pair of metallic elements. The coefficient of thermal expansion for aluminum is $18.35 \times 10^{-6}$ and for nickel alloy steel the coefficient of thermal expansion can be varied by varying the nickel content from $13 \times 10^{-6}$ to $19 \times 10^{-6}$. Accordingly, by proper selection of the nickel content, the coefficient of thermal expansion for the two metallic strands may be made to be the same.

In addition it must be noted that if the hydrogen meter operation is to be effected at a single temperature then the selection of the material for the metallic strands becomes less restrictive. The metallic strands can then be selected independently of their thermal expansion properties. They must, however, be bonded to each other along their entire length at the temperature that the cell is going to be operated at.

In operation the steel tolerates the hydrogen diffusion and changes its cell constant with a change in hydrogen concentration in the solution 14 (FIG. 1). The aluminum is completely resistant to hydrogen diffusion as compared to the nickel allow steel, and accordingly, does not change with a variation in hydrogen concentration. A change in hydrogen concentration in the liquid metal 14 causes diffusion either in or out of the nickel alloy steel changing its lattice constant, and the other element or strand then pulls on the pointer 18 (FIG. 1) to indicate the hydrogen concentration. It should be appreciated that the pointer 18 (FIG. 1) continuously and uninterruptedly indicates the hydrogen concentration which may vary in the solution 14.

Referring to FIGS. 3 and 4, there is illustrated another form of the invention wherein the coiled member is a coiled hollow tube indicated generally at 40. The hollow tube is coiled as shown in FIG. 3, and one end thereof is connected to the containment 12 as at 42. Closure means 44 are provided at the other end of the tube 40, and the connecting link 34 is connected thereto as shown in FIG. 3.

The end of the tube 40 which is connected to the containment 12 is also connected to vacuum means indicated generally at 46, so that the inside of the tube 40 is continuously subjected to a vacuum.

As best seen in FIG. 4, a coating 48 covers the top half of the tube 40 and extends substantially along the entire length of the tube 40. The coating 48 is very thin with respect to the tube 40, and preferably the thickness thereof is of the order of about one thousandth of the thickness of the tube.

The hollow coiled tube is fabricated from a material having the property of changing its cell constant responsive to variation in environmental hydrogen concentration such as stainless steel or nickel, for example. The coating 48 is fabricated from a material whose cell constant does not change substantially in response to changes in the hydrogen concentration in the solution 14 such as molybdenum, for example. The thickness of the coating 48 must be thick enough to slow down the diffusion of hydrogen on one side of the tube by a considerable factor with respect to the uncoated side of the tube, but it must be thin enough so that the thermal expansion does not interfere with the aforementioned cell operation.

In operation, the coiled tubular element 40 is connected to the connecting link 34 as shown in FIG. 3. The coating 48 is resistant to hydrogen diffusion and maintains the respective half of the hollow tube 40 relatively free of hydrogen, whereas the other half of the hollow tube 49 tolerates hydrogen diffusion and changes its cell constant with a change in hydrogen concentration. A change in the hydrogen concentration in the liquid metal 14 causes a diffusion either in or out of the wall of the tube 49 thereby causing a change in its cell or lattice constant which changes its length, causing the pointer to move to a position indicating the new hydrogen concentration on the scale 22 (FIG. 1).

From the foregoing description, it will be seen that I contribute by my invention a new and improved hydrogen metering device which is simple and inexpensive to construct and which is reliable and accurate in operation.

Although several embodiments of the invention are herein disclosed for purposes of explanation, further modification thereof, after study of this specification will be apparent to those skilled in the art to which the invention pertains. Reference should accordingly be had to the appended claims in determining the scope of the invention.

What is claimed and desired to be secured by Letters Patent is:

1. A hydrogen metering device comprising a length of coiled hollow tube fabricated from a material having the property of changing its cell constant in response to variation in environmental hydrogen concentration, closure means for one end of said tube and vacuum producing means connected to the other end of said tube, a coating covering a substantial portion of the surface of one half of said tube and extending along the length thereof, said coating being fabricated from a material whose cell constant does not change substantially in response to changes in said hydrogen concentration, said coating being thick enough to slow down diffusion of hydrogen on the coated side of the tube by a discernible factor with respect to the uncoated side of the tube and said coating being thin enough so that the thermal expansion does not interfere with the cell operation, whereby a variation in hydrogen concentration causes anticlastic bending of the tube.

2. A hydrogen device comprising a length of coiled hollow tube fabricated from a material having the property of changing its cell constant in response to variation in environmental hydrogen concentration, closure means for one end of said tube and vacuum producing means connected to the other end of said tube, a coating covering substantially one-half of said tube and extending along the length thereof, said coating having a thickness of the order of about one thousandth of the thickness of said tube, said coating being fabricated from a material whose cell constant does not change substantially in response to changes in said hydrogen concentration, said coating being thick enough to slow down diffusion of hydrogen on the coated side of the tube by a discernible factor with respect to the uncoated side of the tube and said coating being thin enough so that the thermal expansion does not interfere with the cell operation, whereby a variation in hydrogen concentration causes anticlastic bending of the tube.

3. A hydrogen metering device comprising a length of coiled hollow tube fabricated from a material having the property of changing its cell constant in response to variation in environmental hydrogen concentration, a containment for containing a fluid to be tested, said tube having a first end connected to said containment and having a second free end, closure means for said free end of said tube and vacuum producing means connected to the first end of said tube, indicator means connected adjacent the free end of said tube, a thin coating covering a substantial portion of the surface of one-half of said tube and extending along the length thereof, said coating being fabricated from a material whose cell constant does not change substantially in response to changes in said hydrogen concentration, said coating being thick enough to slow down diffusion of hydrogen on the coated side of the tube by a discernible factor with respect to the uncoated side of the tube and said coating being thin enough so that the thermal expansion does not interfere with the cell operation, whereby a variation in hydrogen concentration causes anticlastic bending of the tube causing an indicator reading on said indicator means.

4. A device for continuously monitoring the hydrogen concentration in a liquid sodium solution comprising a length of coiled hollow tube fabricated from a metal having the property of changing its cell constant in response to variation in environmental hydrogen concentration, a containment for containing said liquid sodium solution to be tested, the first end of said tube being connected to said containment, closure means for the second end of said tube, indicator means connected adjacent said second end of said tube and vacuum producing means connected to the first end of said tube, a coating fabricated from molybdenum which does not change substantially in response to changes in said hydrogen concentration and covering substantially one-half of said tube and extending along the length thereof, said coating having a thickness of the order of about one thousandth of the thickness of said tube, said coating being thick enough to slow down diffusion of hydrogen on the coated side of the tube by a discernible factor with respect to the uncoated side of the tube and said coating being thin enough so that the thermal expansion does not interfere with the cell operation, whereby a variation in hydrogen concentration causes anticlastic bending of the tube causing an indicator reading on said indicator means.

5. A device for continuously monitoring the hydrogen concentration in a liquid sodium solution according to claim 4 wherein the metal from which said coiled hollow tube is fabricated is stainless steel.

6. A device for continuously monitoring the hydrogen concentration in a liquid sodium solution according to claim 4 wherein the metal from which said coiled hollow tube is fabricated contains nickel.

References Cited

UNITED STATES PATENTS

| | | | |
|---|---|---|---|
| 3,040,561 | 6/1962 | Wright | 73—19 |
| 2,307,800 | 1/1943 | Norton | 73—26 |

FOREIGN PATENTS

| | | |
|---|---|---|
| 4,629 | 1/1890 | Great Britain. |
| 776,020 | 10/1934 | France. |

RICHARD C. QUEISSER, Primary Examiner

ELLIS J. KOCH, Assistant Examiner

U.S. Cl. X.R.

73—19